United States Patent
Qiang et al.

(10) Patent No.: US 12,185,264 B2
(45) Date of Patent: Dec. 31, 2024

(54) TIME-SENSITIVE NETWORKING TIME SYNCHRONIZATION METHOD AND APPARATUS

(71) Applicant: HUAWEI TECHNOLOGIES CO., LTD., Guangdong (CN)

(72) Inventors: Li Qiang, Beijing (CN); Junren Chang, Beijing (CN); Xiangdong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/868,510

(22) Filed: Jul. 19, 2022

(65) Prior Publication Data
US 2022/0353834 A1 Nov. 3, 2022

Related U.S. Application Data

(63) Continuation of application No. PCT/CN2020/073919, filed on Jan. 22, 2020.

(51) Int. Cl.
*H04W 56/00* (2009.01)
*H04J 3/06* (2006.01)
(Continued)

(52) U.S. Cl.
CPC ......... *H04W 56/001* (2013.01); *H04J 3/0658* (2013.01); *H04L 12/4633* (2013.01); *H04W 24/02* (2013.01); *H04L 2212/00* (2013.01)

(58) Field of Classification Search
CPC ... H04W 56/001; H04W 24/02; H04J 3/0658; H04J 3/0667; H04L 12/4633; H04L 2212/00
See application file for complete search history.

(56) References Cited

U.S. PATENT DOCUMENTS 10,044,524 B1  8/2018 Edelhaus et al.
2014/0362872 A1* 12/2014 Grenabo ............... H04J 3/0667
                                                                  370/507
(Continued)

FOREIGN PATENT DOCUMENTS

| CN | 103684731 A | 3/2014 |
| CN | 110611924 A | 12/2019 |
| EP | 2800315 A1 | 11/2014 |

OTHER PUBLICATIONS

Nokia et al., "TSN Synchronization Requirements Evaluation," 3GPP TSG-RAN WG2 Meeting #103bis, R2-1814993, Chengdu, China, Oct. 8-12, 2018, 5 pages.
(Continued)

*Primary Examiner* — Kyaw Z Soe
(74) *Attorney, Agent, or Firm* — Fish & Richardson P.C.

(57) ABSTRACT

This application discloses a TSN time synchronization method and apparatus. One example method includes: a first apparatus receives a first TSN time synchronization message from a second apparatus; the first apparatus determines that the first TSN time synchronization message does not carry a first time, where the first time is a system time of a wireless communication system when the second apparatus receives the first TSN time synchronization message; and the first apparatus locally obtains a bridge residence time, write the bridge residence time into the first TSN time synchronization message, and send the first TSN time synchronization message.

10 Claims, 7 Drawing Sheets

(51) Int. Cl.
*H04L 12/46* (2006.01)
*H04W 24/02* (2009.01)

(56) References Cited

U.S. PATENT DOCUMENTS

| | | | | |
|---|---|---|---|---|
| 2016/0170440 | A1* | 6/2016 | Aweya | G06F 1/10 |
| | | | | 713/503 |
| 2018/0091245 | A1 | 3/2018 | Leyrer et al. | |
| 2019/0253339 | A1 | 8/2019 | Mehmedagic | |

OTHER PUBLICATIONS

Ericsson et al., "Proposal of Merge (Solution11 option3 and solution28)," 3GPP TSG-SA WG2 Meeting #132, 82-1903372, Xi'An, China, Apr. 5-12, 2019, 9 pages.
3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.
Ericsson, "Support of Solution 28A in SA2," 3GPP TSG-RAN WG2 #106, R2-1906836, Reno, Nevada, USA, May 13-17, 2019, 2 pages.
Tencent, "TSN Time Stamping Handling," SA WG2 Meeting #134, S2-1907141, Sapporo, Japan, Jun. 24-28, 2019, 3 pages.
Vivo, "Correction on the Bridge Management and Port Management," SA WG2 Meeting #135, S2-1909073, Split, Croatia, Oct. 14-18, 2019, 7 pages.
Extended European Search Report in European Appln No. 20916139.7, dated Nov. 28, 2022, 11 pages.
International Search Report and Written Opinion in International Appln. No. PCT/CN2020/073919, mailed on Oct. 20, 2020, 14 pages (with English translation).

* cited by examiner

TIME-SENSITIVE NETWORKING TIME SYNCHRONIZATION METHOD AND APPARATUS

CROSS-REFERENCE TO RELATED APPLICATIONS

This application is a continuation of International Application No. PCT/CN2020/073919, filed on Jan. 22, 2020, the disclosure of which is hereby incorporated by reference in its entirety.

TECHNICAL FIELD

This application relates to the field of communication technologies, and in particular, to a time-sensitive networking (TSN) time synchronization method and apparatus.

BACKGROUND

Support of TSN in a 5G system has been discussed in 3GPP R16. A TSN system sends time serving information to a TSN node through a 5G system, to implement clock synchronization between TSN nodes in same time domain. In other words, clock times of all TSN nodes are the same. In a 5G system, a functional module, that is, a device side TSN translator (DS-TT), is deployed in user equipment (UE), and a functional module, that is, a network side TSN translator (NW-TT), is deployed in a user plane function (UPF), to adapt to an external TSN system.

Currently, a process of implementing TSN time synchronization is as follows: a TSN clock source sends a time synchronization message (TSN Sync message) to the NW-TT, where the TSN Sync message carries time serving information of the TSN system. The NW-TT reads a current system time Tsi of the 5G system and writes Tsi into the TSN Sync message. The UPF encapsulates the TSN Sync message into a common data plane packet and sends the data plane packet to the DS-TT. When receiving the TSN Sync message, the DS-TT reads a current system time Tse of the 5G system and calculates a 5G system bridge residence time (5GS Virtual Bridge Residence Time) in a 5G system time based on Tse and Tsi. The DS-TT translates the 5GS virtual bridge residence time in the 5G system time into a 5GS virtual bridge residence time in a TSN system time, writes the 5GS virtual bridge residence time obtained through translation into the TSN Sync message, and sends the message to a downstream TSN node. In this way, the TSN node can implement time synchronization with the TSN system based on the time serving information, the 5GS virtual bridge residence time, and other necessary parameters of the TSN system.

Currently, a 5GS virtual bridge residence time calculation process is bound to a TSN time synchronization process. That is, a 5GS virtual bridge residence time needs to be calculated once each time TSN time synchronization is performed. If TSN time synchronization is performed every 30 ms in each TSN time domain, a 5GS virtual bridge residence time needs to be recalculated once every 30 ms. When there are a plurality of TSN time domains, the 5GS virtual bridge residence time is calculated more frequently. Consequently, processing costs of the 5G system are high.

SUMMARY

This application provides a TSN time synchronization method and apparatus, to reduce high processing costs of a wireless communication system during TSN synchronization.

According to a first aspect, an embodiment of this application provides a TSN time synchronization method. The method includes: a first apparatus receives a first TSN time synchronization message from a second apparatus; the first apparatus determines that the first TSN time synchronization message does not carry a first time, where the first time is a system time of a wireless communication system when the second apparatus receives the first TSN time synchronization message; and the first apparatus locally obtains a bridge residence time, write the bridge residence time into the first TSN time synchronization message, and send the first TSN time synchronization message.

In this embodiment of this application, the first apparatus may locally store the bridge residence time, so that w % ben the TSN time synchronization message does not carry a receiving time of the second apparatus, the bridge residence time is locally obtained without recalculation. This can reduce frequency of calculating the bridge residence time, and reduce calculation costs of the wireless communication system. In addition, the TSN time synchronization message may not carry the receiving time of the second apparatus, so that an operation of reading a system timestamp can be reduced, thereby reducing hardware processing costs, and reducing a read/write operation on a packet. In addition, the first apparatus locally obtains the bridge residence time, so that complexity of a TSN time synchronization process can be reduced, thereby saving time.

In a possible design, the locally obtained bridge residence time may be a time value on a wireless communication system clock, or may be a time value of a TSN system time.

In a possible design, before the first apparatus locally obtains the bridge residence time, the first apparatus may receive a second TSN time synchronization message from the second apparatus, where the second TSN time synchronization message carries a second time, and the second time is a system time of the wireless communication system when the second apparatus receives the second TSN time synchronization message. The first apparatus determines a bridge residence time based on the second time, to obtain a first value. The first apparatus updates the locally recorded bridge residence time to the first value.

According to the foregoing design, when the TSN time synchronization message carries the receiving time of the second apparatus, the first apparatus may determine to recalculate the bridge residence time, so that the locally stored bridge residence time can be updated in time, thereby improving accuracy of TSN time synchronization.

In a possible design, before the first apparatus locally obtains the bridge residence time, the first apparatus may receive a data packet from the second apparatus, where a QoS parameter of a quality of service (QoS) flow that carries the data packet is the same as a QoS parameter of a QoS flow that carries the TSN time synchronization message, the data packet carries a third time, and the third time is a system time of the wireless communication system when the second apparatus receives the data packet. The first apparatus determines a bridge residence time based on the third time, to obtain a second value. The first apparatus updates the locally recorded bridge residence time to the second value.

According to the foregoing design, when the data packet carries the receiving time of the second apparatus, the first apparatus may determine to recalculate the bridge residence time, so that the locally stored bridge residence time can be updated in time, thereby improving accuracy of TSN time synchronization.

According to a second aspect, an embodiment of this application provides a TSN time synchronization method.

The method includes: a second apparatus receives a TSN time synchronization message or a data packet, where a QoS parameter of a QoS flow that carries the data packet is the same as a QoS parameter of a QoS flow that carries the TSN time synchronization message. The second apparatus sends the TSN time synchronization message or the data packet to a first apparatus, where whether the TSN time synchronization message or the data packet carries a network access time is related to a timer, the timer is used to record an effective time of a bridge residence time, and the network access time is a system time of a wireless communication system when the second apparatus receives the TSN time synchronization message or the data packet.

In this embodiment of this application, a timer is maintained. Before the timer expires, recalculation of the bridge residence time is not triggered even if the TSN time synchronization message is received. This can reduce frequency of calculating the bridge residence time, and reduce calculation costs of the wireless communication system. In addition, according to the method provided in this embodiment of this application, an operation of reading a system timestamp can be reduced, thereby reducing hardware processing costs, and reducing a read/write operation on a packet. In addition, when the timer does not expire, the wireless communication network may locally obtain the bridge residence time, so that complexity of a TSN time synchronization process can be reduced, thereby saving time.

In a possible design, if the timer expires, the TSN time synchronization message or the data packet carries the network access time. In the foregoing design, the TSN time synchronization message or the data packet carries the network access time, so that the first apparatus can be triggered in time to recalculate the bridge residence time, thereby improving accuracy of TSN time synchronization.

In a possible design, the second apparatus may reset the timer after the second apparatus sends the TSN time synchronization message or the data packet to the first apparatus. In the foregoing design, the timer is reset, so that frequency of calculating the bridge residence time can be reduced.

In a possible design, if the timer does not expire, the TSN time synchronization message or the data packet does not carry the network access time. According to the foregoing design, after receiving a TSN time synchronization message or a data packet, a DS-TT may not recalculate a bridge residence time, so that frequency of calculating the bridge residence time can be reduced.

According to a third aspect, this application provides a TSN time synchronization apparatus. The apparatus may be a communication device, or may be a chip or a chipset in a communication device. The communication device may be a first apparatus or a second apparatus. The apparatus may include a processing unit and a communication unit. When the apparatus is a communication device, the processing unit may be a processor, and the communication unit may be a transceiver. The apparatus may further include a storage module, and the storage module may be a memory. The storage module is configured to store instructions. The processing unit executes the instructions stored in the storage module, so that the first apparatus performs a corresponding function in the first aspect, or the processing unit executes the instructions stored in the storage module, so that the second apparatus performs a corresponding function in the second aspect. When the apparatus is a chip or a chipset in a communication device, the processing unit may be a processor, and the communication unit may be an input/output interface, a pin, a circuit, or the like. The processing unit executes instructions stored in a storage module, so that the first apparatus performs a corresponding function in the first aspect, or the processing unit executes instructions stored in a storage module, so that the second apparatus performs a corresponding function in the second aspect. The storage module may be a storage module (for example, a register or a cache) in the chip or the chipset, or may be a storage module (for example, a read-only memory or a random access memory) that is in a network device and that is located outside the chip or the chipset.

According to a fourth aspect, a TSN time synchronization apparatus is provided, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the TSN time synchronization method according to the first aspect or any design of the first aspect, or the second aspect or any design of the second aspect.

According to a fifth aspect, this application further provides a computer-readable storage medium. The computer-readable storage medium stores instructions, and when the instructions are run on a computer, the computer is enabled to perform the TSN time synchronization method according to the first aspect or any design of the first aspect, or the second aspect or any design of the second aspect.

According to a sixth aspect, this application further provides a computer program product that includes instructions. When the computer program product runs on a computer, the computer is enabled to perform the TSN time synchronization method according to the first aspect or any design of the first aspect, or the second aspect or any design of the second aspect.

According to a seventh aspect, this application further provides a wireless communication system. The wireless communication system includes a first apparatus and a second apparatus. The first apparatus may perform a corresponding function in the first aspect, and the second apparatus may perform a corresponding function in the second aspect.

According to an eighth aspect, an embodiment of this application provides a chip. The chip includes a memory, at least one processor and communication interface. The processor is coupled to the memory, and is configured to read a computer program stored in the memory, to perform the method according to the first aspect or any design of the first aspect, or the second aspect or any design of the second aspect in embodiments of this application.

According to a ninth aspect, an embodiment of this application provides a chip, including a communication interface and at least one processor. The processor runs to perform the method according to the first aspect or any design of the first aspect, or the second aspect or any design of the second aspect in embodiments of this application.

It should be noted that "coupling" in embodiments of this application indicates a direct combination or an indirect combination of two components.

DESCRIPTION OF EMBODIMENTS

To make the objectives, technical solutions, and advantages of embodiments of this application clearer, the following clearly and completely describes the technical solutions in embodiments of this application with reference to the accompanying drawings in embodiments of this application.

ATSN time synchronization method provided in this application may be applied to a wireless communication system that supports TSN. An architecture of the communication system may be shown in FIG. 1. The communication system includes a radio access network device 101 and a terminal device 102, and may further include a core network device 103. The communication device 102 may be connected to a TSN node, for example, a TSN end node or a TSN bridge. The core network device 103 may be connected to a TSN node, for example, a TSN clock source or a TSN bridge. The communication system in embodiments of this application may include various communication systems, for example, a long term evolution (LTE) communication system, a 5th generation (5G) communication system, a hybrid architecture of a plurality of communication systems, for example, an LTE-5G hybrid architecture, or a new communication system that emerges in future communication development.

Figure 1:
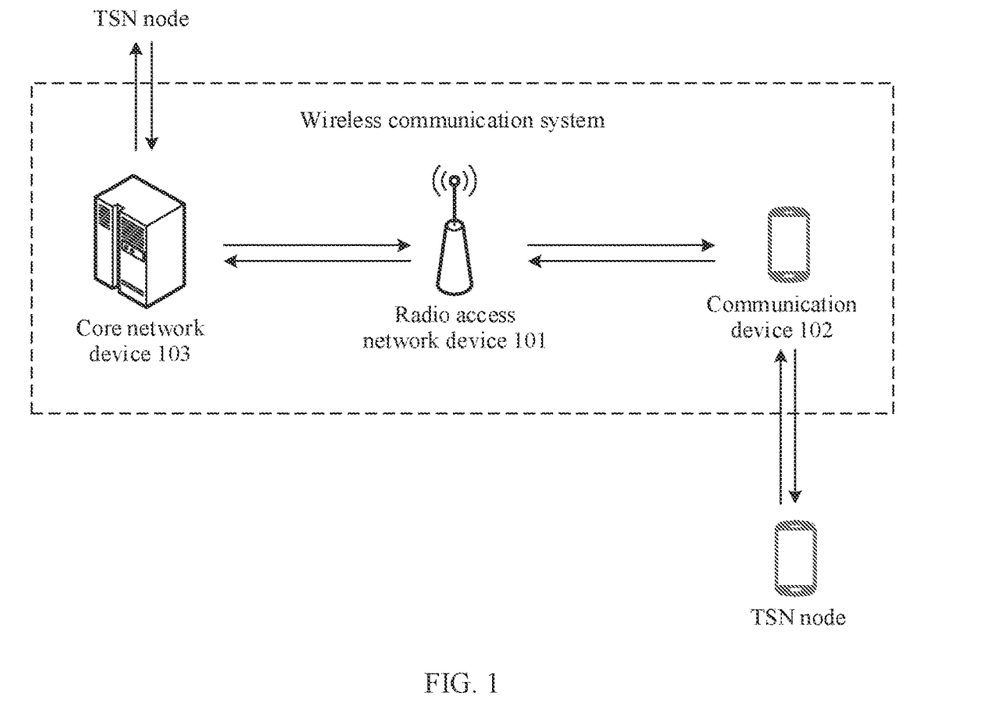
FIG. 1 is a schematic diagram depicting an architecture of a communication system according to an embodiment of this application.

The radio access network device 101 may be a common base station (for example, a NodeB or an eNB), a new radio controller (NR controller), a gNodeB (gNB) or an en-gNB in a 5G system, a centralized network element (centralized unit), a new radio base station, a remote radio module, a micro base station, a relay, a distributed network element (distributed unit), a reception point (transmission reception point, TRP), a transmission point (TP), or any other radio access device. This is not limited in embodiments of this application.

The communication device 102 may be a terminal device, or may be a relay station such as customer-premises equipment (CPE). Alternatively, the communication device 102 may be a function of a base station. The terminal device is also referred to as user equipment (UE), and is a device that provides a user with voice and/or data connectivity, for example, a handheld device or a vehicle-mounted device having a wireless connection function. Common terminals include a mobile phone, a tablet computer, a notebook computer, a palmtop computer, a mobile internet device (MID), and a wearable device, such as a smart watch, a smart band, or a pedometer. For ease of description, the communication device 102 is collectively referred to as a Node-X in embodiments of this application.

The core network device 103 may be a user plane function (UPF).

Figure 2:
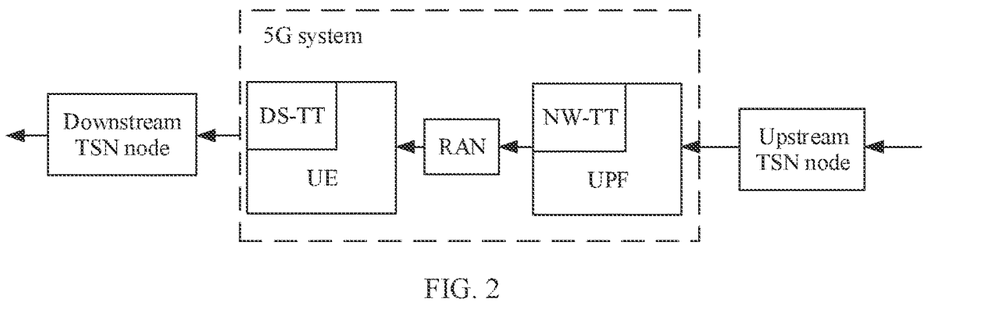
FIG. 2 is a schematic diagram depicting an architecture of a 5G system according to an embodiment of this application.

A TSN system sends time serving information through a TSN node, to implement clock synchronization between TSN nodes in same time domain. In other words, clock times of all TSN nodes are the same. In a wireless communication system, a functional module, that is, a DS-TT, is deployed in UE, and a functional module, that is, an NW-TIT, is deployed in a UPF, to adapt to an external TSN system. An example in which the wireless communication system is a 5G system (5GS) is used, as shown in FIG. 2. When the 5GS functions as a TSN bridge, the 5GS may be referred to as a 5GS virtual TSN bridge.

Figure 3:
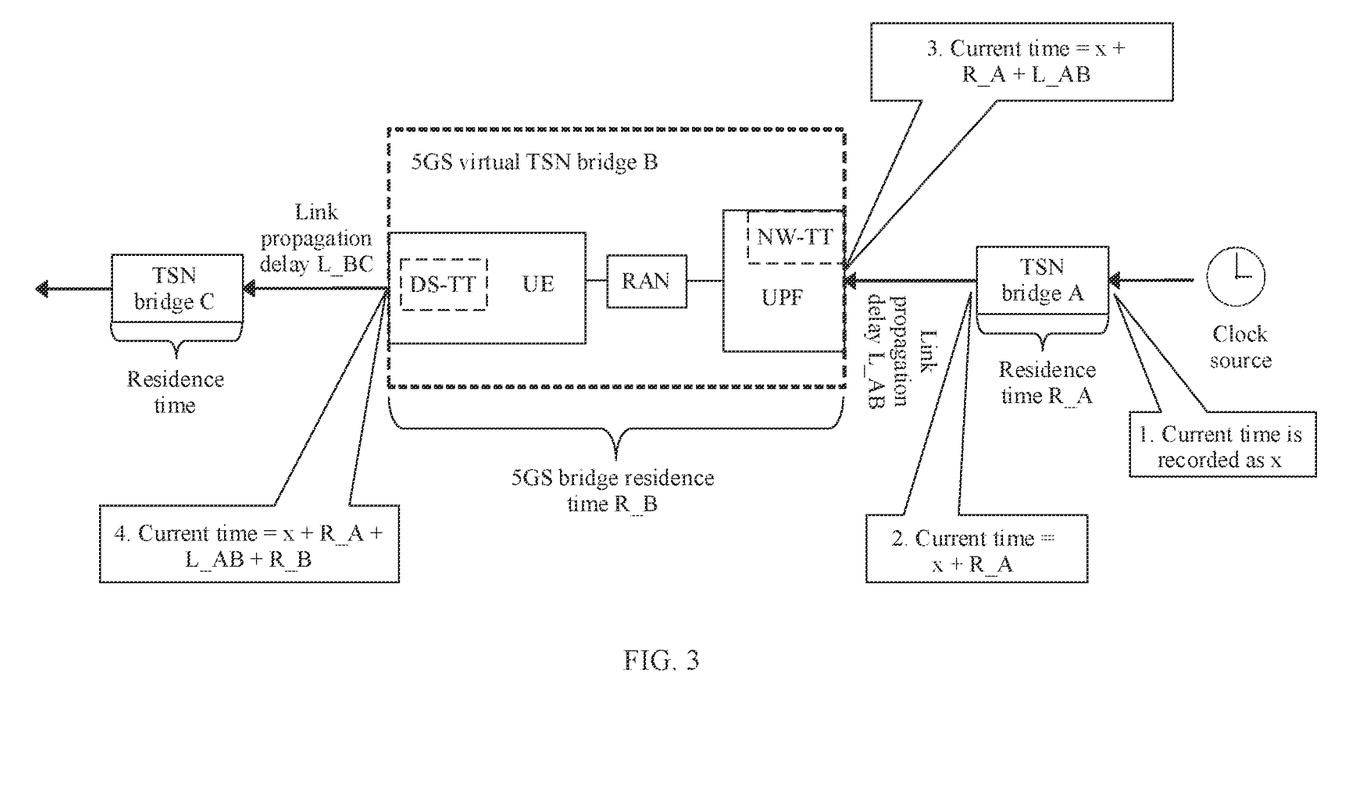
FIG. 3 is a schematic diagram depicting an architecture of a TSN system according to an embodiment of this application.

In a 3GPP TSN architecture, a residence time and a link propagation delay of each TSN bridge (including a common TSN bridge and a 5GS virtual TSN bridge) needs to be calculated for TSN time synchronization. As shown in FIG. 3, it is assumed that there are three TSN bridges: A, B, and C. A and C are common TSN bridges, and B is a 5GS virtual TSN bridge. TSN bridge residence times of the three TSN bridges are recorded as R_A, R_B, and R_C. A link propagation delay between the TSN bridge A and the TSN bridge B is recorded as L_AB, and a link propagation delay between the TSN bridge B and the TSN bridge C is recorded as L_BC. As shown in FIG. 3, in a TSN time synchronization process:

1. It is assumed that an inbound interface of the TSN bridge A receives a time synchronization message (Sync message) from a TSN clock source. The Sync message carries a current time x of the TSN clock source.
2. When the Sync message reaches an outbound interface of the TSN bridge A, a current time of the TSN clock source carried in the Sync message is x+R_A.
3. When the Sync message is transmitted from the TSN bridge A to an inbound interface (namely, an NW-TT) of the TSN bridge B through a link between the TSN bridge A and the TSN bridge B, the current time of the TSN clock source carried in the Sync message is set to x+R_A+L_AB.
4. When the Sync message reaches an outbound interface (namely, a DS-TT) of the TSN bridge B, the current time of the TSN clock source carried in the Sync message is set to x+R_A+L_AB+R_B.

The rest can be deduced by analogy.

Figure 4:
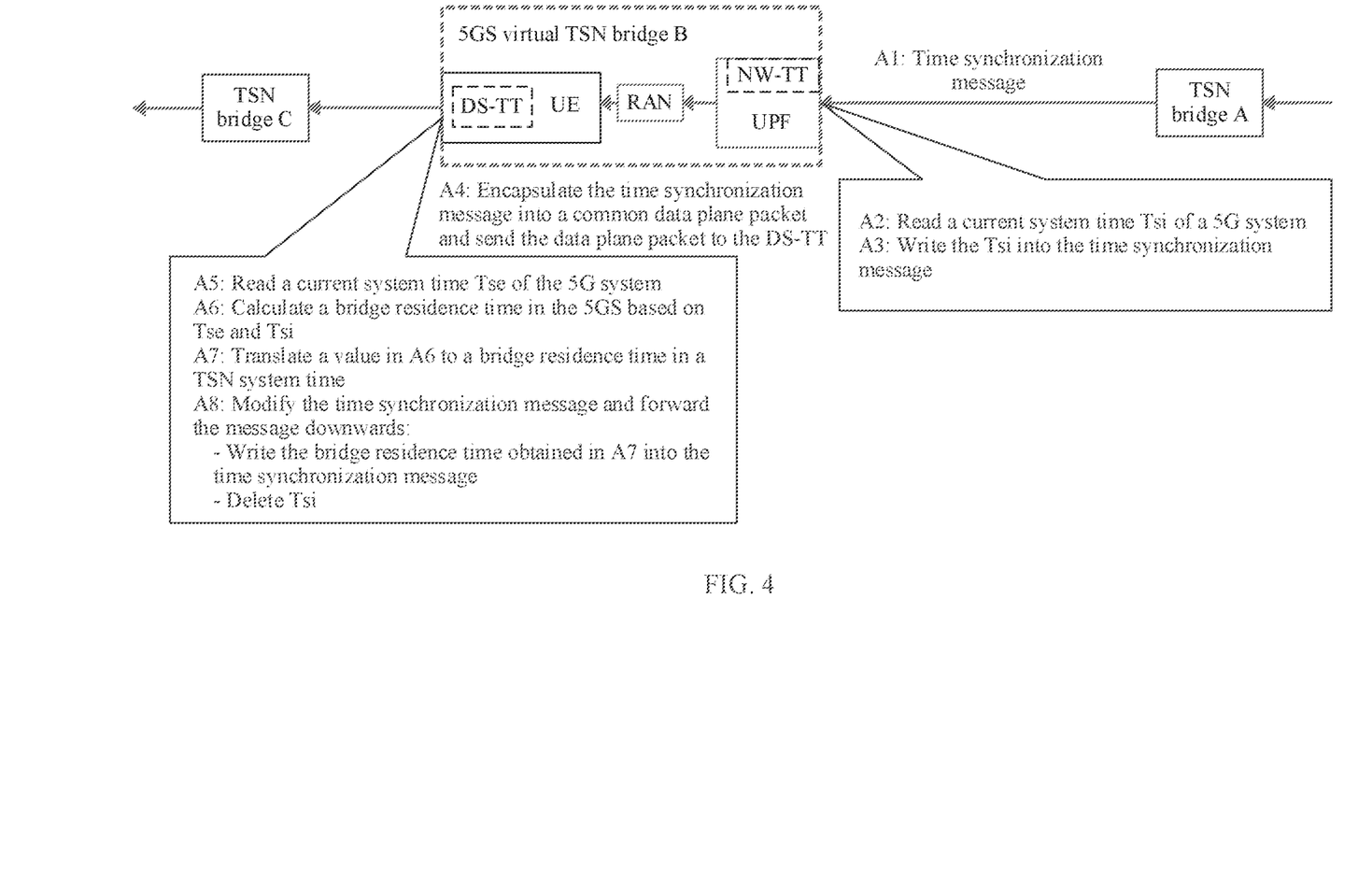
FIG. 4 is a schematic diagram of a process in which a 5GS virtual TSN bridge transmits a Sync message according to an embodiment of this application.

The TSN system architecture shown in FIG. 3 is used as an example. As shown in FIG. 4, a process in which a 5GS virtual TSN bridge transmits a Sync message may be as follows:

A1: The TSN bridge A sends a Sync message to the NW-TT. The Sync message carries a current time x+R_A+L_AB of the TSN clock source.

A2: The NW-TT reads a current system time Tsi of the 5G system.

A3: The NW-TT writes Tsi into the Sync message.

A4: A UPF encapsulates the Sync message into a common data plane packet, and sends the data plane packet to the DS-TT.

A5: After receiving the Sync message, the DS-TT reads a current system time Tse of the 5G system.

A6: The DS-TT calculates a 5GS virtual bridge residence time, namely, R_B, in a 5G system time based on Tse and Tsi, where R_B=Tse−Tsi.

A7: The DS-TT translates the 5GS virtual bridge residence time in the 5GS system time into a 5GS virtual bridge residence time in a TSN system time.

A8: The DS-TT writes the 5GS virtual bridge residence time obtained through translation into the Sync message, that is, sets the current time of the TSN clock source carried in the Sync message to x+R_A+L_AB+ R_B, deletes Tsi, and sends the Sync message to the TSN bridge C.

Currently, a 5GS virtual bridge residence time calculation process is bound to a TSN time synchronization process. That is, a 5GS virtual bridge residence time needs to be calculated once each time TSN time synchronization is performed. If TSN time synchronization is performed every 30 ms in each TSN time domain, a 5GS virtual bridge residence time needs to be recalculated once every 30 ms. When there are a plurality of TSN time domains, the 5GS virtual bridge residence time is calculated more frequently. For example, if there are two TSN time domains, the 5GS virtual bridge residence time needs to be recalculated once every 15 ms on average. Consequently, calculation costs of the 5G system are high.

In addition, each time the 5GS virtual bridge residence time is calculated, dedicated hardware needs to be invoked to add a timestamp (such as Tsi and Tse), and frequent 5GS virtual bridge residence time calculation increases hardware processing costs.

In addition, each time the 5GS virtual bridge residence time is calculated, a timestamp needs to be added to a packet (for example, the timestamp Tsi is added to the Sync message in A2), and a timestamp needs to be deleted (for example. Tsi in the Sync message is deleted in A8). This increases a read/write operation on the packet. For example, if a timestamp occupies 80 bits, a read/write operation on additional 80 bits of the packet is increased.

In addition, a 5GS virtual bridge residence time calculation process is bound to a TSN time synchronization process. Consequently, the TSN time synchronization process becomes complex.

Based on this, this application provides a TSN time synchronization method and apparatus, to resolve a problem in conventional technologies that processing costs of a wireless communication system are high in a TSN time synchronization process. The method and the apparatus are based on a same inventive concept. A problem-resolving principle of the method is similar to that of the apparatus. Therefore, mutual reference may be made between implementation of the apparatus and implementation of the method. A repeated description is not described again.

It should be understood that, in embodiments of this application, "at least one" means one or more, and "a plurality of" means two or more. The term "and/or" describes an association relationship between associated objects, and represents that three relationships may exist. For example. A and/or B may represent the following cases: only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

In addition, it should be understood that in descriptions of this application, terms such as "first" and "second" are merely intended for purposes of description, shall not be understood as an indication or implication of relative importance, shall not be understood as an indication or implication of a sequence, and shall not be understood as a quantity.

The following specifically describes a TSN time synchronization method provided in this application with reference to the accompanying drawings.

Figure 5:
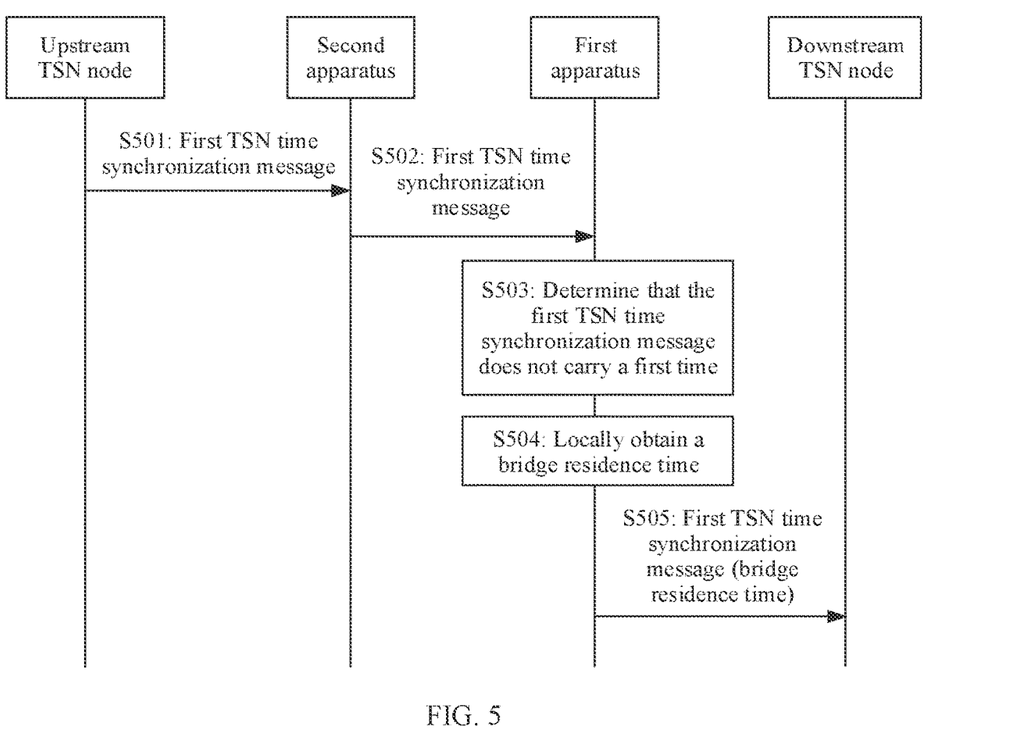
FIG. 5 is a flowchart of a TSN time synchronization method according to an embodiment of this application.

FIG. 5 is a flowchart of a TSN time synchronization method according to an embodiment of this application. The method may be applied to the wireless communication system shown in FIG. 1. The method specifically includes the following steps.

S501: A second apparatus receives data. The data may be a first TSN time synchronization message, or may be a first data packet. A QoS parameter of a quality of service (QoS) flow that carries the first data packet is the same as a QoS parameter of a QoS flow that carries the first TSN time synchronization message. For ease of description, the following uses the first TSN time synchronization message as an example for description. A TSN time synchronization process when the data is the first data packet is similar to a TSN time synchronization process when the data is the first TSN time synchronization message.

In an implementation, the second apparatus may receive the first TSN time synchronization message from an upstream TSN node. For example, in the TSN system shown in FIG. 3, if the upstream TSN node of the wireless communication system is the TSN bridge A, the NW-TT (namely, the second apparatus) may receive the first TSN time synchronization message from the TSN bridge A. For another example, if the upstream TSN node of the wireless communication system is the TSN clock source, the second apparatus may receive the first TSN time synchronization message from the TSN clock source.

The TSN time synchronization message may be named as a TSN Sync message, a Sync message, or certainly may be named as another message. This is not specifically limited herein.

S502: The second apparatus sends the first TSN time synchronization message to a first apparatus. Whether the first TSN time synchronization message carries a first time is related to a timer. The timer is used to record an effective time of a bridge residence time, and a network access time is a system time of the wireless communication system when the second apparatus receives the first TSN time synchronization message.

If the timer does not expire, the first TSN time synchronization message may not carry the first time. If the timer expires, the first TSN time synchronization message may carry the first time.

Further, if the timer expires, the second apparatus may reset the timer after sending the first TSN time synchronization message to the first apparatus.

In this embodiment of this application, the first apparatus may be an apparatus that sends a time synchronization message to a downstream TSN node (for example, a downstream TSN bridge or a TSN end node) in the wireless communication system. The second apparatus may be an apparatus that receives a time synchronization message sent by an upstream TSN node (for example, an upstream TSN bridge or the TSN clock source) in the wireless communication system. For example, in the wireless communication system, if a TSN time synchronization message from an upstream TSN node is received by an NW-TT and is sent by a DS-TT to a downstream TSN node, the first apparatus may be the DS-TT, and the second apparatus may be the NW-IT. For another example, in the wireless communication system, if a TSN time synchronization message from an upstream TSN node is received by a DS-TT and is sent by an NW-TT to a downstream TSN node, the first apparatus may be the NW-TT, and the second apparatus may be the DS-TT. For another example, in the wireless communication system, if a TSN time synchronization message from an upstream TSN node is received by a first DS-TT, the TSN time synchronization message is sent by the first DS-TT to an NW-TT, forwarded by the NW-TT to a second DS-TT in the wireless communication system, and sent by the second DS-TT to a downstream TSN node, the first apparatus may be the second DS-TT, and the second apparatus may be the first DS-TT. The first DS-TT may be deployed on a same communication device, or may be deployed on different communication devices. This is not specifically limited herein.

It should be understood that the "NW-TT" and the "DS-TT" are merely example names. In future communication development, the NW-TT and the DS-TT may also be named as others, for example, the "NW-TT" is named as A. If A can implement functions of the "NW-TT" in embodiments of this application, A may be understood as the "NW-TT" in embodiments of this application. For another example, the "DS-TT" is named as B. If B can implement functions of the "DS-TT" in embodiments of this application, B may be understood as the "DS-TT" in embodiments of this application.

In an example description, the NW-TT may be deployed in a UPF. In other words, the NW-TT may be a functional module in the UPF. Alternatively, the NW-TT may be deployed outside the UPF. Optionally, when the NW-TT is deployed outside the UPF, the NW-TT may be connected to the UPF.

The DS-TT may be deployed in a terminal device. In other words, the DS-TT may be a functional module in the terminal device. Alternatively, the DS-TT may be deployed outside the terminal device. This is not specifically limited herein.

S503: The first apparatus determines that the first TSN time synchronization message does not carry the first time.

S504: The first apparatus locally obtains a bridge residence time.

After the entire wireless communication system is considered as a TSN bridge, the bridge residence time may be understood as a time elapsed from a time point at which a data plane packet enters an inbound interface of the bridge to a time point at which the data plane packet leaves an outbound interface of the bridge, that is, a time elapsed from a time point at which the data plane packet arrives at the second apparatus to a time point at which the data plane packet leaves the first apparatus. For example, when the wireless communication system is a 5G system, the bridge residence time may be referred to as a 5GS bridge residence time.

The locally stored bridge residence time may be a time value on a wireless communication system clock, or may be a time value on a TSN system clock.

Further, if the locally stored bridge residence time is a time value on the wireless communication system clock, after step S504, the first apparatus may translate the locally obtained bridge residence time from the time value on the wireless communication system clock to a time value on the TSN system clock.

In a possible implementation, before the first apparatus locally obtains the bridge residence time, the first apparatus may receive a second TSN time synchronization message from the second apparatus, where the second TSN time synchronization message carries a second time, and the second time is a system time of the wireless communication system when the second apparatus receives the second TSN time synchronization message. The first apparatus may determine a bridge residence time based on the second time, to obtain a first value, and updates the locally recorded bridge residence time to the first value.

In an example description, the second TSN time synchronization message and the first TSN time synchronization message may be from a same TSN clock source. Alternatively, a QoS parameter of a QoS flow that carries the second TSN time synchronization message may be the same as the QoS parameter of the QoS flow that carries the first TSN time synchronization message.

Optionally, if the locally stored bridge residence time is a time value on the wireless communication system clock, the first apparatus may determine the bridge residence time based on the second time in the following manner: when receiving the second TSN time synchronization message, the first apparatus reads a current system time of the wireless communication system, namely, a fourth time. The first apparatus calculates, based on the second time and the fourth time, a time value of the bridge residence time on the wireless communication system clock, that is, the first value.

If the locally stored bridge residence time is a time value of the TSN system clock, the first apparatus may determine the bridge residence time based on the second time in the following manner: when receiving the second TSN time synchronization message, the first apparatus reads a current system time of the wireless communication system, namely, a fourth time. The first apparatus calculates the bridge residence time in the wireless communication system time based on the second time and the fourth time. The first apparatus translates a time value of the bridge residence time on the wireless communication system clock into a time value on the TSN system clock, namely, the first value.

For example, the time value of the bridge residence time on the wireless communication system clock may satisfy the following formula: the time value of the bridge residence time on the wireless communication system clock=the fourth time−the second time. Alternatively, it may be understood that the first apparatus subtracts the second time from the fourth time to obtain the time value of the bridge residence time on the wireless communication system clock.

In another possible implementation, before the first apparatus locally obtains the bridge residence time, the first apparatus may further receive a second data packet from the second apparatus, where the data packet carries a third time, and the third time is a system time of the wireless communication system when the second apparatus receives the second data packet. The first apparatus determines a bridge residence time based on the third time, to obtain a second value, and updates the locally recorded bridge residence time to the second value.

In an example description, a QoS parameter of a QoS flow that carries the second data packet may be the same as the QoS parameter of the QoS flow that carries the second TSN time synchronization message. Alternatively, a QoS parameter of a QoS flow that carries the second data packet may be the same as the QoS parameter of the QoS flow that carries the first TSN time synchronization message. Alternatively, a QoS parameter of a QoS flow that carries the second data packet may be the same as the QoS parameter of the QoS flow that carries the first data packet.

A manner in which the first apparatus determines the bridge residence time based on the third time may be similar to a manner in which the first apparatus determines the bridge residence time based on the second time. A difference lies in that when determining the bridge residence time based on the second time, the first apparatus uses the time when the second apparatus receives the second TSN time synchronization message (namely, the second time) and the time when the first apparatus sends the second TSN time synchronization message (namely, the fourth time); but when determining the bridge residence time based on the third time, the first apparatus uses the time when the second apparatus receives the second data packet (namely, the third time) and a time when the first apparatus sends the second data packet.

S505: The first apparatus sends the first TSN time synchronization message. The first TSN time synchronization message carries the network residence time.

In an implementation, the first apparatus may send the first TSN time synchronization message to a downstream TSN node. For example, in the TSN system shown in FIG. 3, if the downstream TSN node of the wireless communication system is the TSN bridge C, the first apparatus (namely, the DS-TT) may send the first TSN time synchronization message that carries the network residence time to the TSN bridge C. For another example, if the downstream TSN node of the wireless communication system is the TSN end node, the first apparatus may send the first TSN time synchronization message that carries the network residence time to the TSN clock source.

In this embodiment of this application, a timer is maintained. Before the timer expires, recalculation of the bridge residence time is not triggered even if the TSN time synchronization message is received. This can reduce frequency of calculating the bridge residence time, and reduce calculation costs of the wireless communication system. In addition, according to the method provided in this embodiment of this application, an operation of reading a system timestamp can be reduced, thereby reducing hardware processing costs, and reducing a read/write operation on a packet. In addition, when the timer does not expire, the wireless communication network may locally obtain the bridge residence time, so that complexity of a TSN time synchronization process can be reduced, thereby saving time.

In some embodiments, if the timer expires, that is, the first TSN time synchronization message sent in step S502 carries the first time, a following process may be performed: the first apparatus may determine that the first TSN time synchronization message carries the first time. The first apparatus determines a bridge residence time based on the first time, to obtain a third value, and updates the locally recorded bridge residence time to the third value.

Further, the first apparatus may send the first TSN time synchronization message carrying the bridge residence time that is the third value.

In an example description, a manner in which the first apparatus determines the bridge residence time based on the first time is similar to a manner in which the first apparatus determines the bridge residence time based on the second time. A difference lies in that when determining the bridge residence time based on the second time, the first apparatus uses the time when the second apparatus receives the second TSN time synchronization message (namely, the second time) and the time when the first apparatus receives the second TSN time synchronization message (namely, the fourth time); but when determining the bridge residence time based on the first time, the first apparatus uses the time when the second apparatus receives the first TSN time synchronization message (namely, the first time) and the time when the first apparatus sends the first TSN time synchronization message.

In an implementation, after writing the bridge residence time that is the first value into the first TSN time synchronization message, the first apparatus may delete the first time in the first TSN time synchronization message.

For better understanding of the solutions provided in embodiments of this application, the following uses a scenario in which an NW-TT receives a TSN time synchronization message from an upstream TSN node and a DS-TT sends the TSN time synchronization message to a downstream TSN node in a wireless communication system as an example, that is, uses an example in which the first apparatus is a DS-TT and the second apparatus is an NW-TT for description with reference to a specific example.

Figure 6:
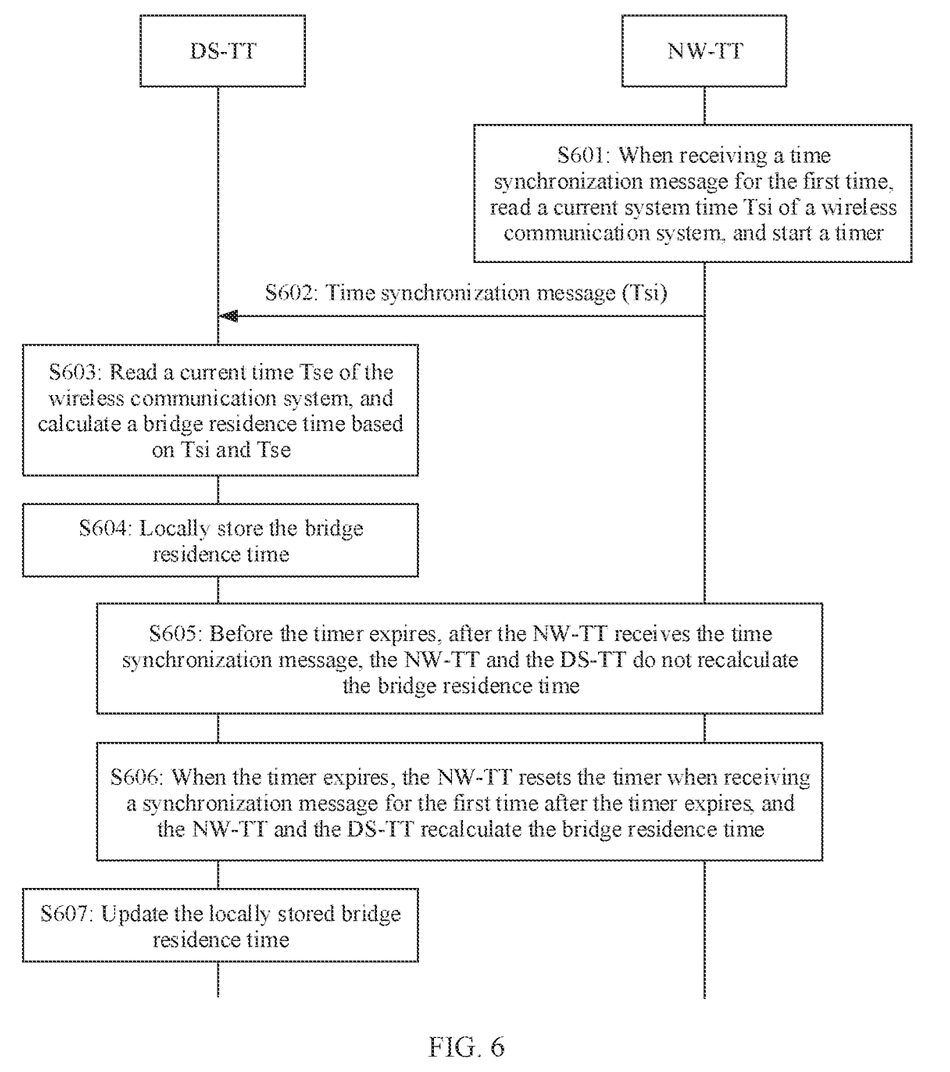
FIG. 6 is a flowchart of calculating a bridge residence time by a wireless communication system according to an embodiment of this application.

Example 1: As shown in FIG. 6, a process in which a wireless communication system calculates a bridge residence time is as follows.

S601: When receiving a Sync message for the first time, an NW-TT reads a current system time Tsi of the wireless communication system, and starts a timer.

S602: The NW-TT sends the Sync message that carries Tsi to a DS-TT.

In an implementation, the NW-TT may send the Sync message to a terminal device through a data plane, and then the terminal device sends the Sync message to the DS-TT.

S603: The DS-TT receives the Sync message, reads a current time Tse of the wireless communication system, and calculates a bridge residence time based on Tsi and Tse.

For example, the bridge residence time may be a time value on a wireless communication system clock, or may be a time value on a TSN system clock.

If a locally stored bridge residence time is a time value on the wireless communication system clock, the DS-TT may calculate a time value of the bridge residence time on the wireless communication system clock by subtracting Tsi from Tse.

If the locally stored bridge residence time is a time value on the TSN system clock, the DS-TT may calculate a time value of the bridge residence time on the wireless communication system clock by subtracting Tsi from Tse, and then translate the bridge residence time from the time value on the wireless communication system clock to a time value on the TSN system clock.

S604: The DS-TT locally stores the bridge residence time.

S605: Before the timer expires (that is, in a period when the timer does not expire), after the NW-TT receives the Sync message, the NW-TT and the DS-TT do not recalculate the bridge residence time.

In an example description, that the NW-TT does not recalculate the bridge residence time after receiving the Sync message may be understood as that the NW-TT forwards the Sync message through the data plane after receiving the Sync message without reading a current system time of the wireless communication system, and the system time does not need to be carried in the Sync message w % ben the DS-TT sends the Sync message. When sending the Sync message to a downstream TSN node, the DS-TT locally obtains the bridge residence time.

S606: When the timer expires (that is, when the timer times out), the NW-TT resets the timer when receiving a TSN Sync message for the first time after the timer expires, and the NW-TT and the DS-TT recalculate the bridge residence time.

For details of a process in which the NW-TT and the DS-TT recalculate the bridge residence time, refer to the foregoing steps S601 to S603. Repeated parts are not described again.

S607: The DS-TT updates the locally stored bridge residence time.

Figure 7:
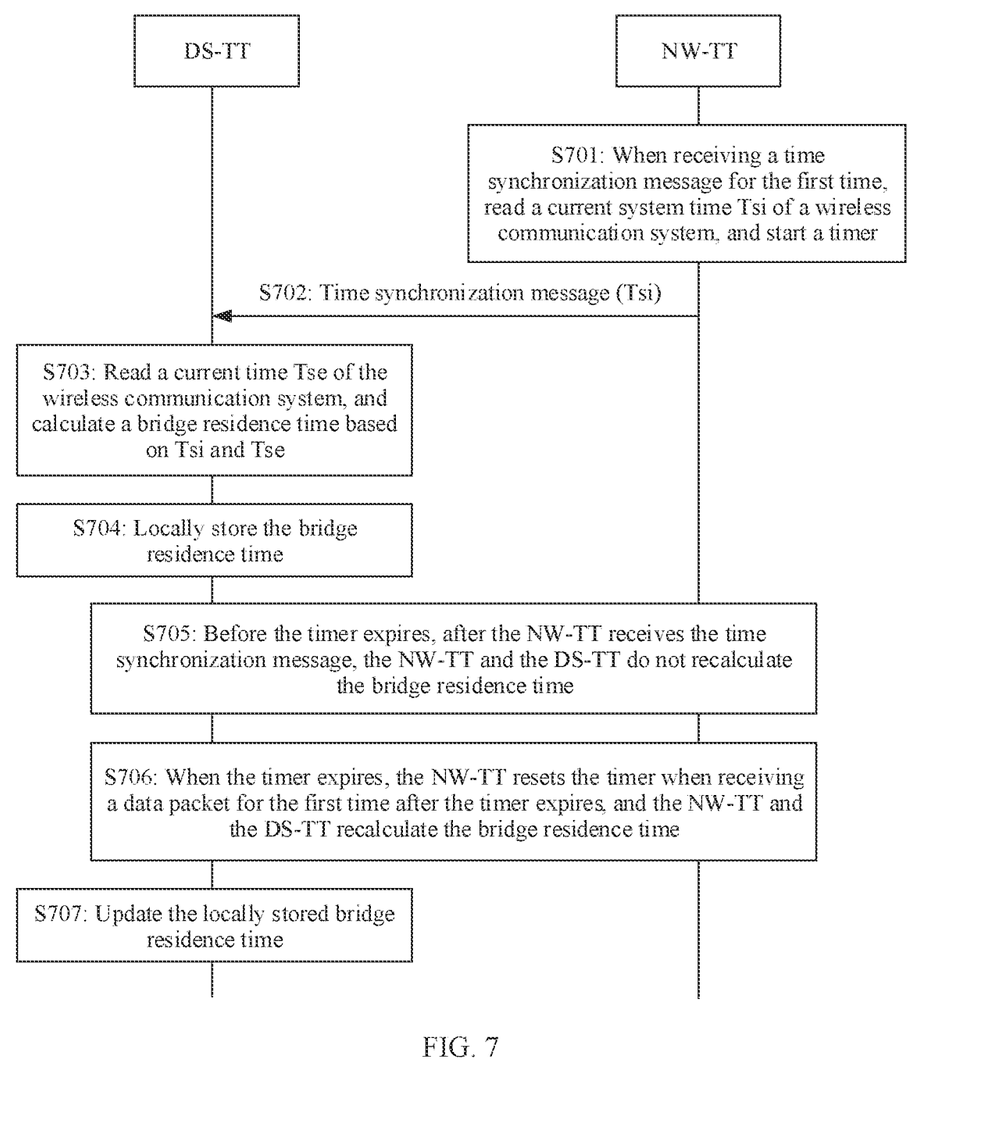
FIG. 7 is another flowchart of calculating a bridge residence time by a wireless communication system according to an embodiment of this application.

Example 2: As shown in FIG. 7, a process in which a wireless communication system calculates a bridge residence time is as follows.

For details of steps S701 to S705, refer to the foregoing steps S601 to S605. Repeated parts are not described again.

S706: When the timer expires (that is, when the timer times out), the NW-TT resets the timer when receiving a data packet for the first time after the timer expires, and the NW-TT and the DS-TT recalculate the bridge residence time. A QoS parameter of a QoS flow that carries the data packet may be the same as a QoS parameter of a QoS flow that carries the TSN Sync message.

For details of a process in which the NW-TT and the DS-TT recalculate the bridge residence time, refer to the foregoing steps S601 to S603. Repeated parts are not described again.

S707: The DS-TT updates the locally stored bridge residence time.

Based on a same technical concept as the method embodiment, an embodiment of this application provides a TSN time synchronization apparatus. A structure of the apparatus may be shown in FIG. 8, and includes a processing unit 801 and a communication unit 802.

In an implementation, the TSN time synchronization apparatus may be specifically configured to implement the methods performed by the first apparatus in the embodiments in FIG. 5 to FIG. 7. The apparatus may be the first apparatus, or may be a chip or a chipset in the first apparatus, or a part of a chip in the first apparatus that is configured to perform related method functions. The communication unit 802 is configured to receive a first TSN time synchronization message from a second apparatus. The processing unit 801 is configured to: determine that the first TSN time synchronization message does not carry a first time, where the first time is a system time of a wireless communication system when the second apparatus receives the first TSN time synchronization message; and locally obtain a bridge residence time. The communication unit 802 is further configured to send the first TSN time synchronization message, where the first TSN time synchronization message carries the network residence time.

Figure 8:
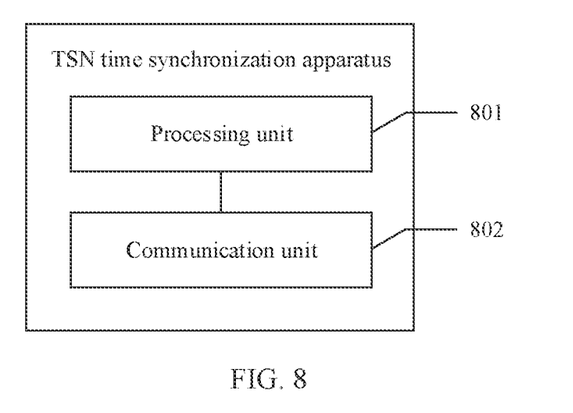
FIG. 8 is a schematic diagram depicting a structure of a TSN time synchronization apparatus according to an embodiment of this application.

The communication unit 802 may be further configured to receive a second TSN time synchronization message from the second apparatus before the processing unit 801 locally obtains the bridge residence time, where the second TSN time synchronization message carries a second time, and the second time is a system time of the wireless communication system when the second apparatus receives the second TSN time synchronization message. The processing unit 801 may be further configured to: determine a bridge residence time based on the second time, to obtain a first value; and update the locally recorded bridge residence time to the first value.

The communication unit 802 may be further configured to receive a data packet from the second apparatus before the processing unit 801 locally obtains the bridge residence time, where a QoS parameter of a quality of service QoS flow that carries the data packet is the same as a QoS parameter of a QoS flow that carries the TSN time synchronization message, the data packet carries a third time, and the third time is a system time of the wireless communication system when the second apparatus receives the data packet. The processing unit 801 is further configured to: determine a bridge residence time based on the third time, to obtain a second value; and update the locally recorded bridge residence time to the second value.

In another implementation, the TSN time synchronization apparatus may be specifically configured to implement the methods performed by the second apparatus in the embodiments in FIG. 5 to FIG. 7. The apparatus may be the second apparatus, or may be a chip or a chipset in the second apparatus, or a part of a chip in the second apparatus that is configured to perform related method functions. The communication unit 802 is configured to communicate with another apparatus. By using the communication unit 802, the processing unit 801 is configured to: receive a TSN time synchronization message or a data packet, where a QoS parameter of a quality of service QoS flow that carries the data packet is the same as a QoS parameter of a QoS flow that carries the TSN time synchronization message; and send the TSN time synchronization message or the data packet to the first apparatus, where whether the TSN time synchronization message or the data packet carries a network access time is related to a timer, the timer is used to record an effective time of a bridge residence time, and the network access time is a system time of the wireless communication system when the second apparatus receives the TSN time synchronization message or the data packet.

For example, if the timer expires, the TSN time synchronization message or the data packet carries the network access time.

If the timer expires, the processing unit 801 may be further configured to reset the timer after the TSN time synchronization message or the data packet is sent to the first apparatus.

For example, if the timer does not expire, the TSN time synchronization message or the data packet does not carny the network access time.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 9:
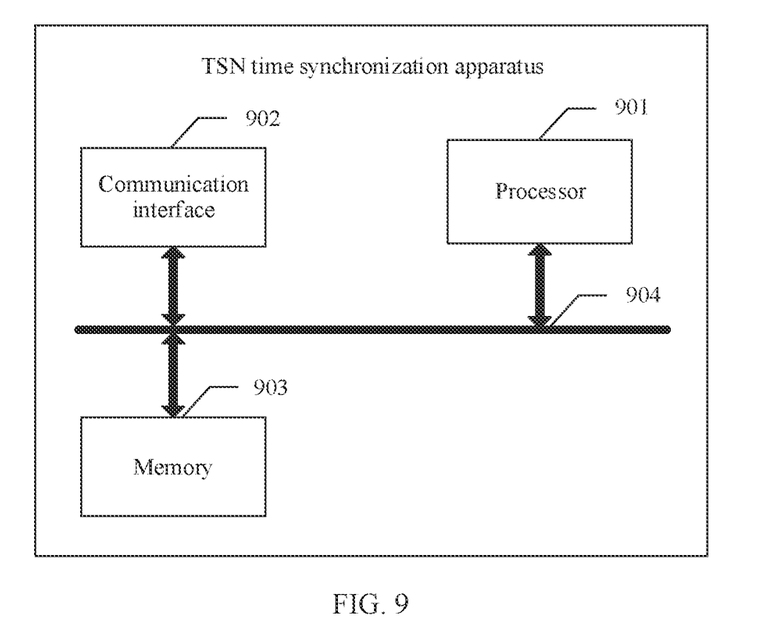
FIG. 9 is a schematic diagram depicting a structure of a TSN time synchronization apparatus according to an embodiment of this application.

In a possible implementation, the TSN time synchronization apparatus may be shown in FIG. 9. The apparatus may be a communication device or a chip in a communication device. The communication device may be a first apparatus or a second apparatus. The apparatus may include a processor 901, a communication interface 902, and a memory 903. The processing unit 801 may be the processor 901. The communication unit 802 may be the communication interface 902.

The processor 901 may be a central processing unit (CPU), a digital processing unit, or the like. The communication interface 902 may be a transceiver, an interface circuit such as a transceiver circuit, a transceiver chip, or the like. The apparatus further includes the memory 903, configured to store a program executed by the processor 901.

The memory 903 may be a nonvolatile memory, for example, a hard disk (hard disk drive, HDD) or a solid-state drive (SSD), or may be a volatile memory, for example, a random access memory (RAM). The memory 903 is any other medium that can be configured to carry or store expected program code that has an instruction or a data structure form and that can be accessed by a computer, but is not limited thereto.

The processor 901 is configured to execute the program code stored in the memory 903, and is specifically configured to perform an action of the processing unit 801. Details are not described herein in this application. The communication interface 902 is specifically configured to perform an action of the communication unit 802. Details are not described herein in this application.

In this embodiment of this application, a specific connection medium between the communication interface 902, the processor 901, and the memory 903 is not limited. In this embodiment of this application, the memory 903, the processor 901, and the communication interface 902 are connected through a bus 904 in FIG. 9, and the bus is represented by a thick line in FIG. 9. A connection manner between other components is merely schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

An embodiment of the present invention further provides a computer-readable storage medium, configured to store computer software instructions for executions by the processor. The computer-readable storage medium includes a program for executions by the processor.

All or a part of the foregoing embodiments may be implemented by software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

This application is described with reference to the flowcharts and/or block diagrams of the method, the device (system), and the computer program product according to this application. It should be understood that the computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or a processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A time-sensitive networking (TSN) time synchronization method, wherein the method comprises:
   receiving, by a first apparatus, a first TSN time synchronization message from a second apparatus;
   determining, by the first apparatus, that the first TSN time synchronization message does not carry a first time, wherein the first time is a system time of a wireless communication system when the second apparatus receives the first TSN time synchronization message;
   locally obtaining, by the first apparatus, a bridge residence time; and
   sending, by the first apparatus, the first TSN time synchronization message, wherein the first TSN time synchronization message carries the bridge residence time.

2. The method according to claim 1, wherein before the locally obtaining, by the first apparatus, bridge residence time, the method further comprises:
   receiving, by the first apparatus, a second TSN time synchronization message from the second apparatus, wherein the second TSN time synchronization message carries a second time, and the second time is a system time of the wireless communication system when the second apparatus receives the second TSN time synchronization message;
   determining, by the first apparatus, a bridge residence time based on the second time, to obtain a first value; and
   updating, by the first apparatus, the locally obtained bridge residence time to the first value.

3. The method according to claim 1, wherein before the locally obtaining, by the first apparatus, bridge residence time, the method further comprises:
receiving, by the first apparatus, a data packet from the second apparatus, wherein a quality of service (QoS) parameter of a QoS flow that carries the data packet is the same as a QoS parameter of a QoS flow that carries the TSN time synchronization message, the data packet carries a third time, and the third time is a system time of the wireless communication system when the second apparatus receives the data packet;
determining, by the first apparatus, a bridge residence time based on the third time, to obtain a second value; and
updating, by the first apparatus, the locally obtained bridge residence time to the second value.

4. A time-sensitive networking (TSN) time synchronization method, wherein the method comprises:
receiving, by a second apparatus, a TSN time synchronization message or a data packet, wherein a quality of service (QoS) parameter of a QoS flow that carries the data packet is the same as a QoS parameter of a QoS flow that carries the TSN time synchronization message; and
sending, by the second apparatus, the TSN time synchronization message or the data packet to a first apparatus, wherein whether the TSN time synchronization message or the data packet carries a network access time is determined based on a timer, wherein
the timer records an effective time of a bridge residence time, and the network access time is a system time of a wireless communication system when the second apparatus receives the TSN time synchronization message or the data packet.

5. The method according to claim 4, wherein if the timer expires, the TSN time synchronization message or the data packet carries the network access time.

6. The method according to claim 5, wherein after the sending, by the second apparatus, the TSN time synchronization message or the data packet to a first apparatus, the method further comprises:
resetting, by the second apparatus, the timer.

7. The method according to claim 4, wherein if the timer does not expire, the TSN time synchronization message or the data packet does not carry the network access time.

8. A time-sensitive networking (TSN) time synchronization apparatus, wherein the apparatus comprises:
a transceiver;
at least one processor; and
one or more memories coupled to the at least one processor and storing programming instructions for execution by the at least one processor to cause the apparatus to:
receive, by using the transceiver, a first TSN time synchronization message from a second apparatus;
determine that the first TSN time synchronization message does not carry a first time, wherein the first time is a system time of a wireless communication system when the second apparatus receives the first TSN time synchronization message; and locally obtain a bridge residence time; and
send, by using the transceiver, the first TSN time synchronization message, wherein the first TSN time synchronization message carries the bridge residence time.

9. The apparatus according to claim 8, wherein the programming instructions, when executed by the at least one processor, cause the apparatus to:
receive, by using the transceiver, a second TSN time synchronization message from the second apparatus before the bridge residence time is obtained, wherein the second TSN time synchronization message carries a second time, and the second time is a system time of the wireless communication system when the second apparatus receives the second TSN time synchronization message; and
determine a bridge residence time based on the second time, to obtain a first value; and update the locally obtained bridge residence time to the first value.

10. The apparatus according to claim 8, wherein the programming instructions, when executed by the at least one processor, cause the apparatus to:
receive, by using the transceiver, a data packet from the second apparatus before the bridge residence time is obtained, wherein a QoS parameter of a quality of service QoS flow that carries the data packet is the same as a QoS parameter of a QoS flow that carries the TSN time synchronization message, the data packet carries a third time, and the third time is a system time of the wireless communication system when the second apparatus receives the data packet; and
determine a bridge residence time based on the third time, to obtain a second value; and update the locally obtained bridge residence time to the second value.

* * * * *